United States Patent [19]

Orme

[11] 4,132,973
[45] Jan. 2, 1979

[54] CABLE WIPER ASSEMBLY

[75] Inventor: Myrl E. Orme, Canoga Park, Calif.

[73] Assignee: The Bendix Corporation, North Hollywood, Calif.

[21] Appl. No.: 763,376

[22] Filed: Jan. 28, 1977

[51] Int. Cl.$^2$ ............................................. B63B 21/16
[52] U.S. Cl. ..................................... 340/3 T; 15/256.5; 114/244; 114/254; 242/54 R
[58] Field of Search ................ 340/3 T; 15/88, 97 R, 15/256.5, 256.6; 242/54 R; 114/244, 245, 253, 254

[56] References Cited

U.S. PATENT DOCUMENTS

| 3,159,806 | 12/1964 | Piasecki | 340/3 T |
| 3,604,387 | 9/1971 | Hale et al. | 114/244 |
| 3,999,240 | 12/1976 | Uchida | 15/256.6 |

Primary Examiner—Richard A. Farley
Attorney, Agent, or Firm—Robert C. Smith; William F. Thornton

[57] ABSTRACT

A cable wiper assembly for airborne sonar includes a housing suspended from a hoist used to rapidly raise and lower a sonar transducer at the end of a cable. The wiper assembly is interposed ahead of the cable-directing sheaves forming part of the hoist to strip away the sea water which adheres to the cable as it is pulled from the ocean. The housing includes a plurality of wiper stages, each of which consists of a washer-like rubber wiper whose internal diameter is just slightly smaller than the cable diameter and a spacer having substantial thickness interposed between wipers with a centrally located well on one side and a flat surface on the other. Radial passageways at the bottom of the wells direct water stripped away by the wipers to the outside of the spacers. The housing includes means clamping the wipers and spacers together and also radial ports for discharging the water flowing away from the spacers. As the cable is deployed, it moves downwardly, causing the wipers to deflect into the wells, thereby interposing insignificant resistance or wiping action on the cable. On retrieval, the cable pulls the wipers against the flat surface of the spacers, causing the wipers to bind against the cable, thereby wiping away water adhering to the cable.

8 Claims, 7 Drawing Figures

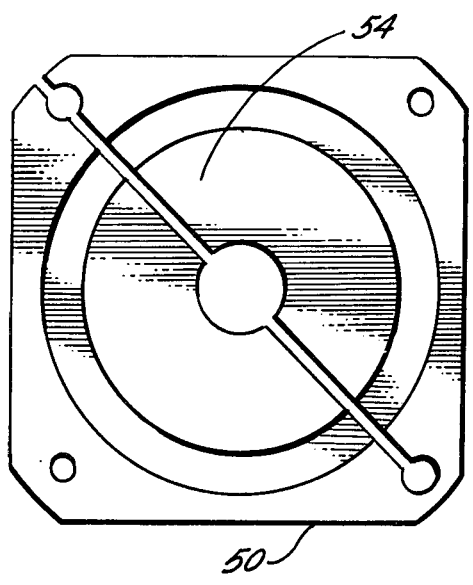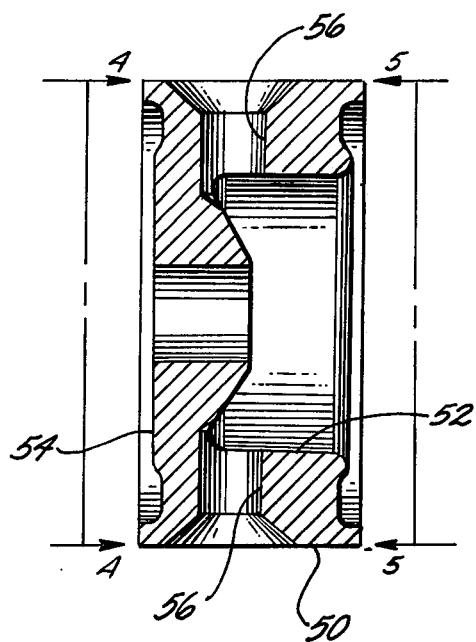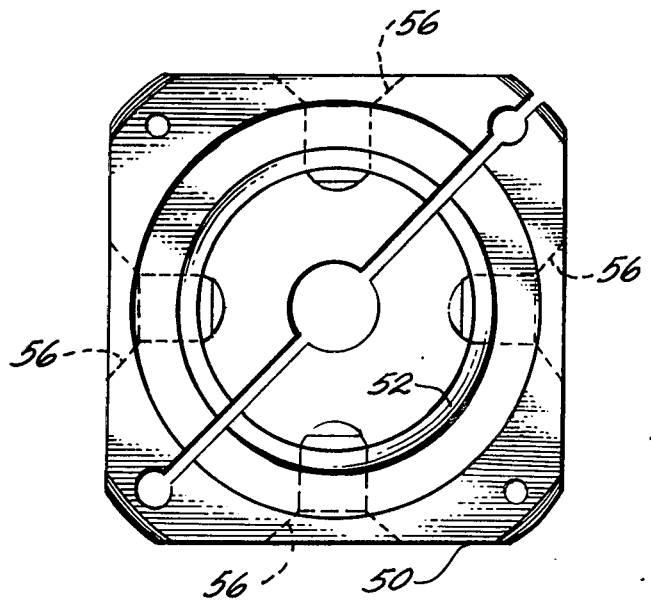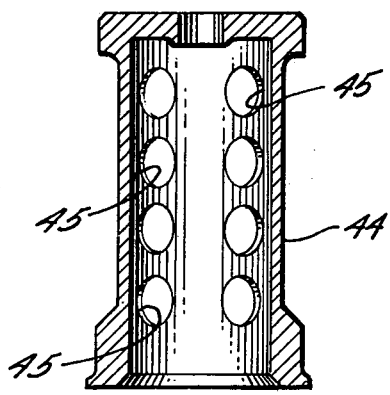

CABLE WIPER ASSEMBLY

BACKGROUND OF THE INVENTION

Airborne sonar systems include a hoist mechanism carried in a helicopter, a storage drum and drive means therefor which operate to lower a sonar transducer into the water and raise it out of the water. When raised, the transducer is carried snugly against a conical seat which prevents it from swinging or moving during flight. Older types of airborne sonar use comparatively heavy transducers with large, thick cables having many strands and are limited in the depth to which the transducer is operated. Although the hoist mechanism is operated at limited speeds, there are problems connected with various aspects of the retrieval. The force required to pull the transducer through the water is greater than that required in air; hence, there is a danger that the transducer may tend to jump out of the water and swing in an uncontrolled manner for a time, which complicates operation of the helicopter. Further, means must be provided to insure that the transducer does not hit against the seat with excessive force. A further problem is that the cable tends to carry a substantial amount of sea water with it as it is reeled in. Since the hoist is within the helicopter and since the water tends to be sprayed all around as the cable passes over the guide sheaves, it has been found necessary to provide a cable wiper between the seat and the guide sheaves to prevent excessive amounts of water from being carried on board the helicopter.

With the advent of later types of airborne sonar, transducer operating depths have become much greater, and cable speeds upon deployment and retrieval have also become much greater. While the cables themselves are smaller in diameter, the greater speed to which they are subjected results in their carrying even greater quantities of water, at least on a per-unit-of-time basis. With the greater reeling speed and the quantity of water carried it was found that, in the absence of a cable wiper, the spray of sea water as the cable made contact with the guide sheave was intolerably heavy. It soon became apparent that the type of wiper used on the earlier, larger cable was inadequate also, primarily because the higher cable speeds used brought on disproportionately greater amounts of water. Thus, to accommodate the smaller, faster moving cable, more needed to be done than simply to decrease the diameter of the hole in the wiping elements to match the diameter of the smaller cable.

DESCRIPTION OF THE DRAWINGS

FIG. 3 is an enlarged sectional view of the spacer of FIG. 2A.

FIG. 4 is a plan view of the spacer of FIG. 3 as seen along line 4—4 of FIG. 3.

FIG. 5 is a plan view of the spacer of FIG. 3 as seen along line 5—5 of FIG. 3.

FIG. 6 is a sectional view of the housing for the wiper structure shown in FIG. 3.

DESCRIPTION OF THE PREFERRED EMBODIMENT

Figure 1:
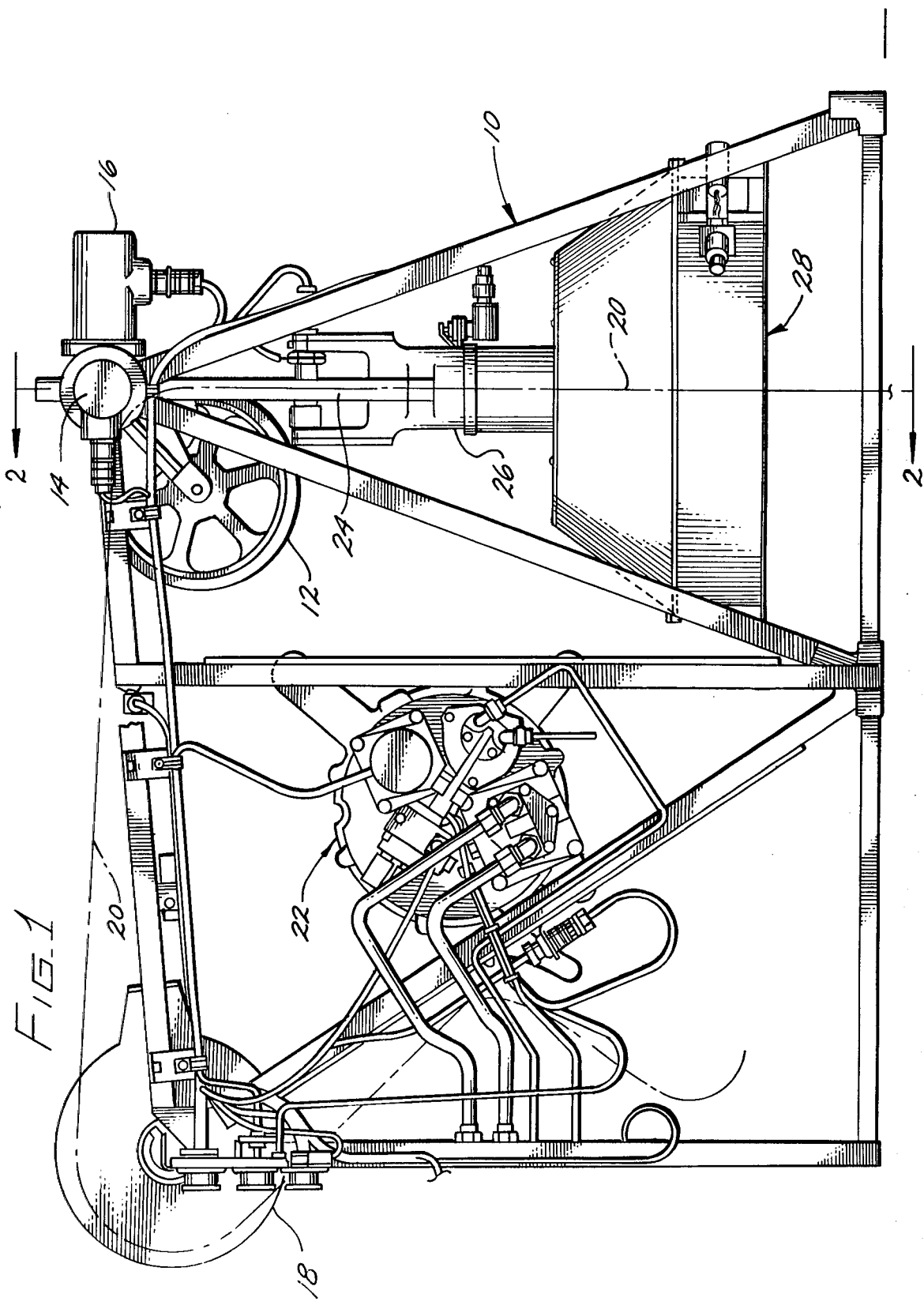
FIG. 1 is a side view of a hoist used for high speed airborne sonar systems including a cable wiper according to my invention.

Referring now to FIG. 1, a hoist frame is shown generally at numeral 10 which stands on the floor of an airborne vehicle such as a helicopter. Carried near the top of frame 10 is a sheave 12 which is mounted to swivel in three dimensions. As the sheave pivots, rotary transformers 14 and 16 sense movement around each of two axes and provide electrical signals to the controls or autopilot of the helicopter. At the rear of the frame is a guide sheave 18 which may be used in association with a level wind structure to cause a cable 20 indicated by dash-dot lines to be wound evenly on a storage drum, not shown, but which is driven and controlled by hydraulic means shown generally at numeral 22.

Suspended from the pivot structure which supports sheave 12 are support members 24 which carry a cable wiper assembly 26. Attached to the frame 10 below the cable wiper assembly 26 is a funnel or seat structure 28 against which the transducer is held when being transported.

Figure 2:
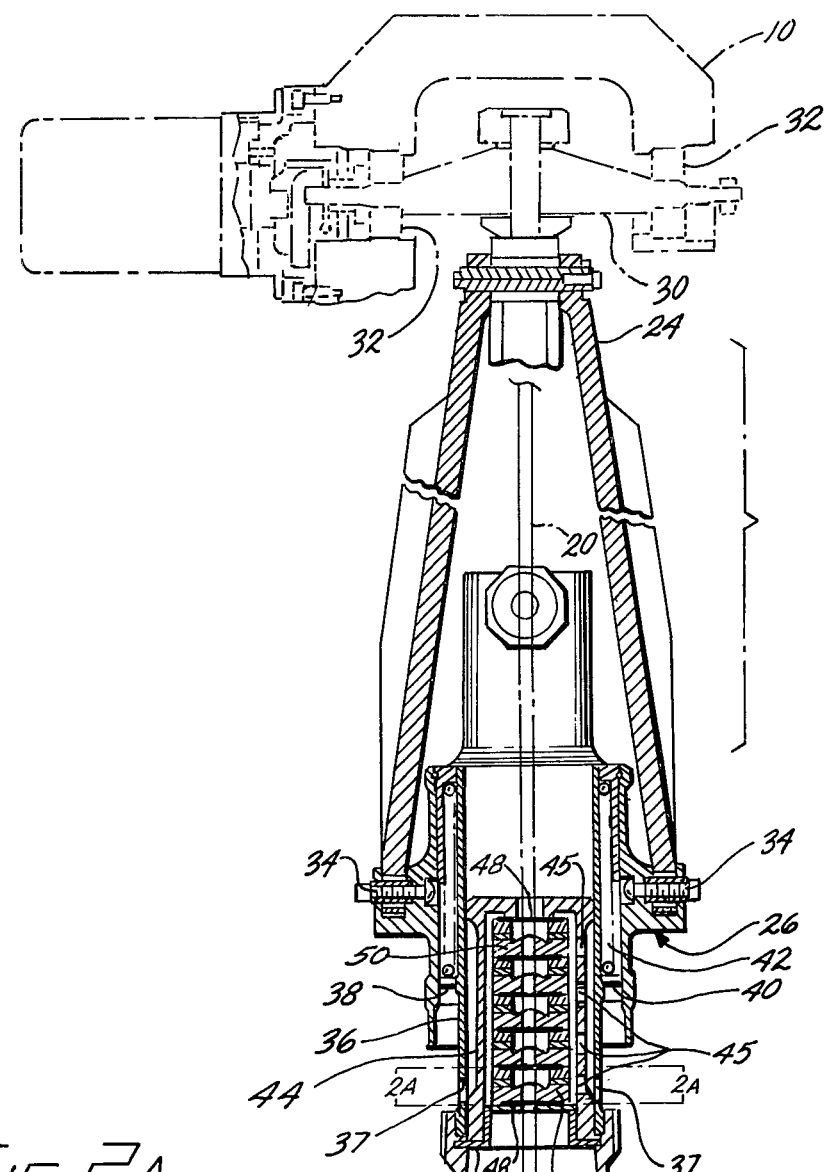
FIG. 2 is a sectional view taken along line 2—2 of FIG. 1.
Figure 2A:
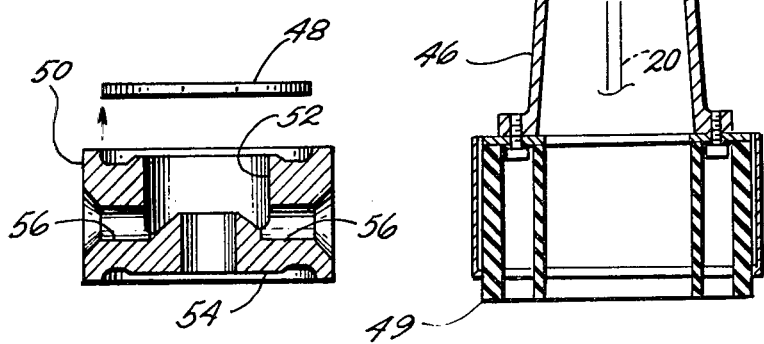
FIG. 2A is an exploded view, partly in section, of a single wiper and spacer as shown in FIG. 2.

FIG. 2 is a sectional view taken along line 2—2 of FIG. 1. In this view it will be seen that the support members 24 are pivotally carried in the frame 10 by means of a cross-member 30 supported in frame 10 by means of bearings 32. The cable wiper structure 26 is, in turn, pivotally supported on members 24 by means of bolts 34 which pass through the housing of cable wiper assembly 26 and support members 24. Carried inside of assembly 26 is a sleeve 36 including are a ports 37 and a flange 38 which holds a retainer 40 for a spring 42. Within sleeve 36 is a generally cylindrical cable wiper housing 44 shown in a greater detail in FIG. 6. Housing 44 has a number of radial ports 45. A frusto-conical transducer stop member 46 holds a hat-shaped retainer member 47 tightly against the bottom of housing 44. Spring 42 is held under compression, and it absorbs some of the shock when a transducer strikes the rubber bumper 49 forming part of member 46. Carried within housing 44 and pressed tightly together by retainer 47 are plurality of wipers 48 interleaved with wiper spacers 50. Details of wipers 48 and spacers 50 are somewhat more clearly FIGS. in FIG. 2A, 3, 4 and 5. In FIG. 2A an individual wiper and spacer are shown enlarged. The wiper 48 is essentially a rubber washer which has a cut through from outside to inside to facilitate getting it around the cable. Once so located, its edges are firmly secured between two spacers or between a spacer and one end of housing 44. The inside diameter of the wiper 48 is slightly smaller than the diameter of cable 20 so that contact with the cable is assured. It will be observed that as cable 20 moves downward, the wiper members will deflect into spacer wells 52, and no significant resistance or force against the cable 20 is exerted. When the cable 20 is being retrieved, it moves rapidly upwardly, carrying a substantial volume of water with it. The wipers press snugly around the cable and are prevented from deflecting significantly in the direction of the cable by the flat adjoining surfaces 54 of the spacers 50. The resulting wiping action causes the water on the cable to be deflected into the wells 52 from whence it is drained through radial ports 56, through ports 45 in housing 44, and out of ports 37 in sleeve 36. Of course, the greatest part of the water is deflected by the lower wiper which is adjacent retainer 50 and caused to flow straight down and out of the bottom of transducer stop member 46.

The number of wiper stages required for any particular application will depend largely upon the speed of deployment and retrieval of the cable. The faster the cable moves, the more water it will tend to carry. Making the wipers fit more tightly around the cable will simply result in wearing on the inside edges of the wipers. This inside diameter should preferably be smaller than the average cable diameter by only a matter of about 0.004 inch.

I claim:

1. In a system for deploying and retrieving a transducer which is operated at substantial depths including a cable connected to said transponder, a hoist, at least one guide sheave on said hoist for directing said cable;
   a cable wiper structure attached to said hoist and suspended therefrom in such manner that said cable is drawn through said structure, said structure including a plurality of flexible washer-like wiper members surrounding said cable,
   a plurality of axially aligned spacers carried in said structure between said wiper members, said spacers being of significant thickness and each having a well below an adjacent wiper member and an essentially flat surface on its opposite side with a passageway through the center of said spacer only slightly larger than the diameter of said cable and a plurality of radial passageways extending through the sides of said spacers from said well to the outside walls of said spacers;
   housing means forming part of said structure including a tubular member enclosing said wiper members and said spacers and which includes a plurality of ports in its sidewall,
   a retainer member adjacent the lower side of the lower wiper member having a central opening somewhat larger than that of said wiper and means securing said retainer tightly against said lower wiper member and hence securing said spacer and wiper members in position against the opposite end of said tubular member, such that upon deployment of said cable said cable passes through said wipers with essentially no resistance since said wipers deflect into the wells of said spacers and upon retrieval of said cable, said cable draws said wipers against said flat surface of said spacers causing said wipers to maintain a snug contact against said wipers causing said wipers to strip away water adhering to the surface of said cable and causing at least part of said water to flow into said wells and from thence through said radial passageways and said ports in said housing means.

2. A cable wiper structure as set forth in claim 1 wherein said structure is suspended from said hoist from a pivot structure.

3. A cable wiper structure as set forth in claim 2 wherein said guide sheave is suspended from and pivots around essentially the same axis as said cable wiper structure.

4. A cable wiper structure as set forth in claim 1 wherein said housing means includes, in addition to said tubular member, a sleeve surrounding said tubular member having radial ports in its sidewalls near the lower end thereof.

5. In a system for deploying and retrieving a transducer which is operated at substantial depths including a cable attached to said transponder, a hoist, at least one guide sheave on said hoist for directing said cable, and a cable wiper structure suspended from said hoist in such manner that said cable is drawn therethrough;
   characterized in that said cable wiper structure comprises a housing,
   a tubular member secured in said housing having a plurality of ports in its sidewall,
   a plurality of flexible washer-like wipers in said tubular member having an internal diameter slightly smaller than the average diameter of said cable,
   a plurality of spacers interposed between said wipers, said spacers being of significant thickness and each having a well below an adjacent wiper member and an essentially flat surface on its opposite side with a passageway through the center of said spacer only slightly larger than the diameter of said cable and a plurality of radial passageways extending through the sides of said spacers from said well to the outside walls of said spacers;
   a retainer member adjacent the lower side of said lower wiper, having a central opening coaxial with and somewhat larger than the central opening of said wiper and means securing said retainer tightly against said lower wiper thereby securing said spacers and wipers against the opposite end of said tubular member whereby upon deployment of said cable the internal wiping surfaces of said wipers are deflected toward said wells and upon retrieval of said cable, said cable draws said wipers against said flat surfaces of said spacers causing said wipers to strip away water adhering to said cable.

6. A cable wiper structure as set forth in claim 5 wherein said structure is suspended from said hoist from a pivot structure.

7. A cable wiper structure as set forth in claim 6 wherein said guide sheave is suspended from and pivots around essentially the same axis as said cable wiper structure.

8. A cable wiper structure as set forth in claim 5 wherein said housing means includes, in addition to said tubular member, a sleeve surrounding said tubular member having radial ports in its sidewalls near the lower end thereof.

* * * * *